No. 694,113. Patented Feb. 25, 1902.
C. S. SHARP.
HARROW.
(Application filed May 25, 1901.)
(No Model.) 3 Sheets—Sheet 3.
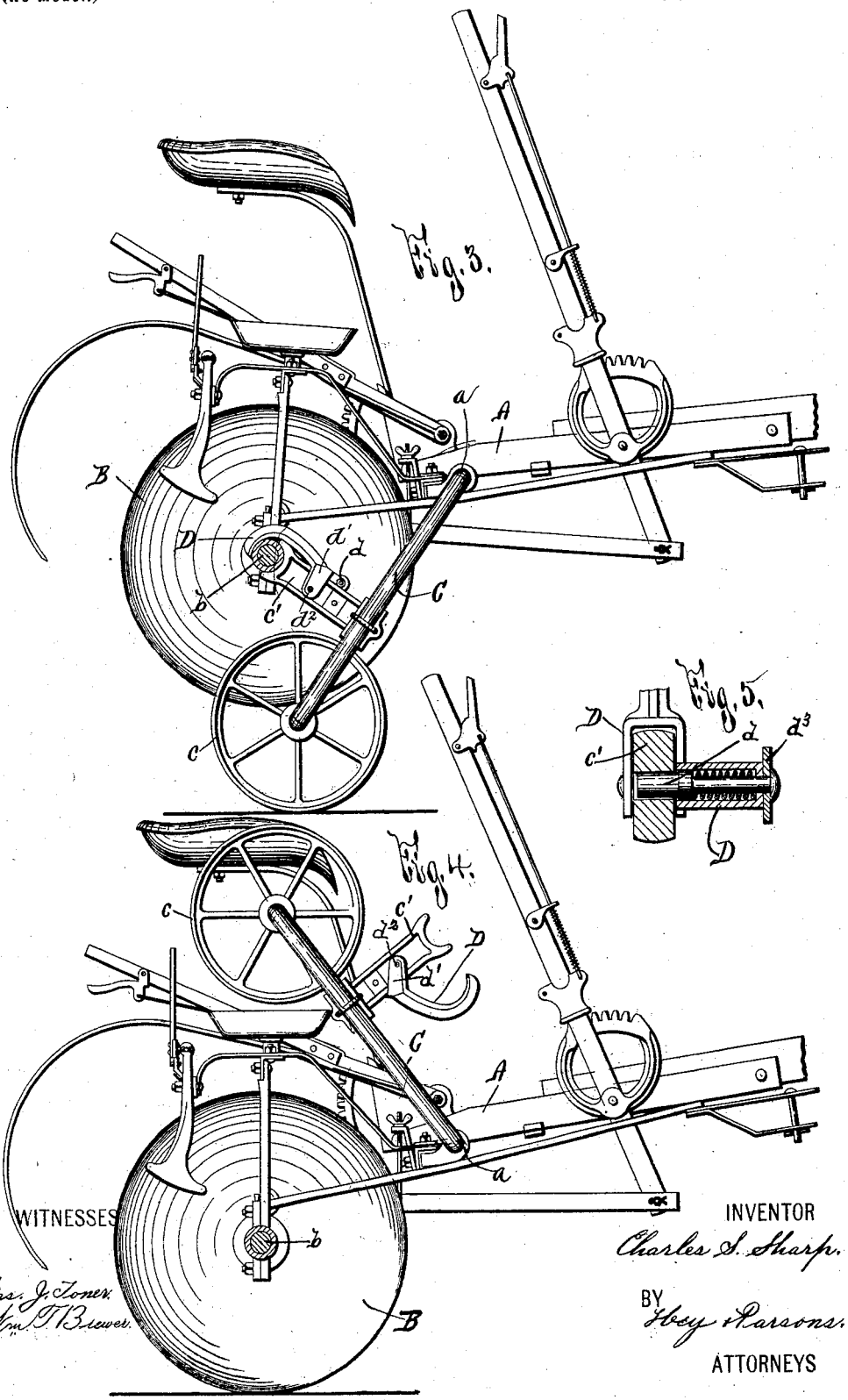
WITNESSES
Chas. J. Toner.
Wm. T. Beaver.
INVENTOR
Charles S. Sharp.
BY
Hey Parsons.
ATTORNEYS

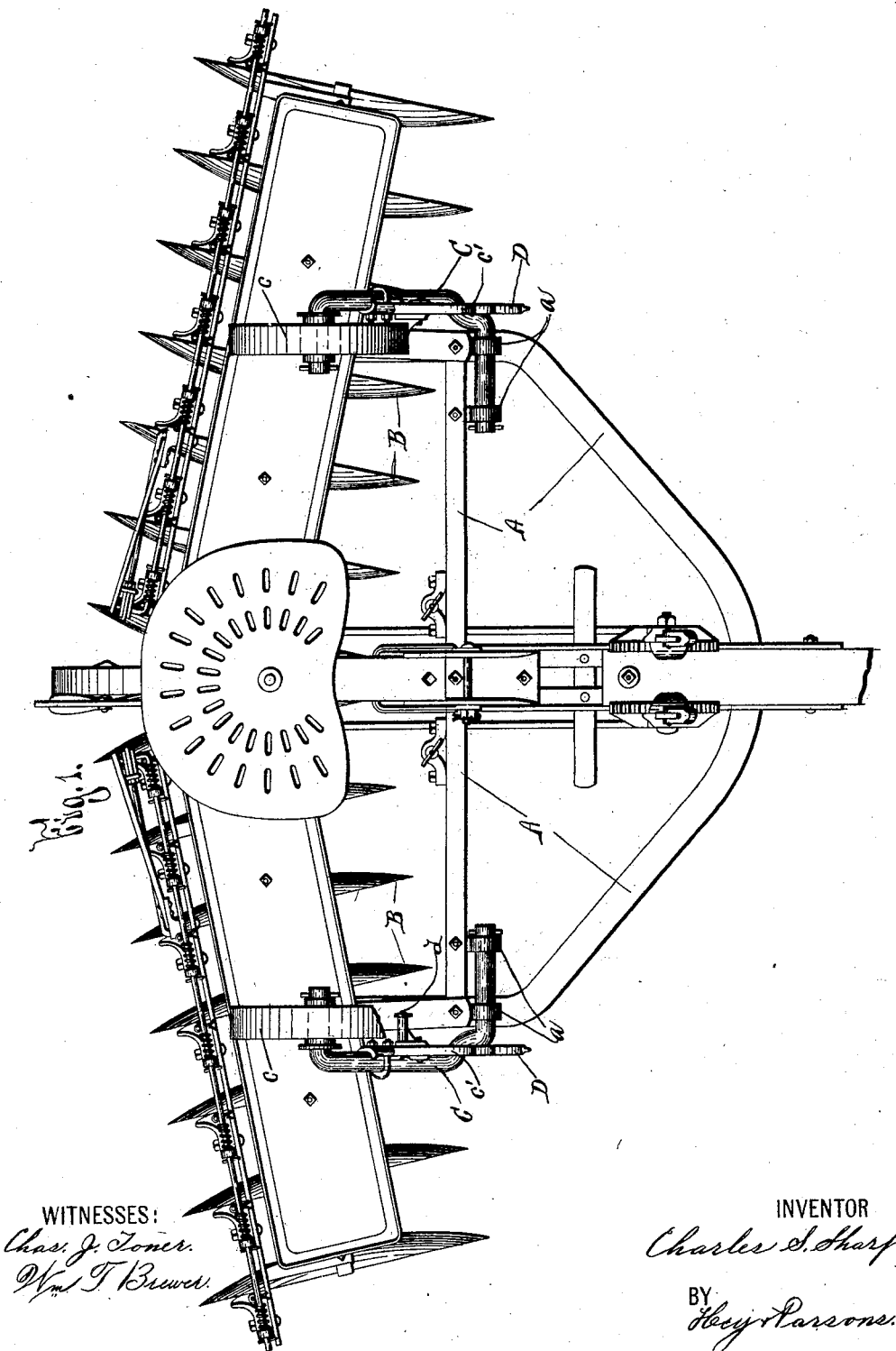

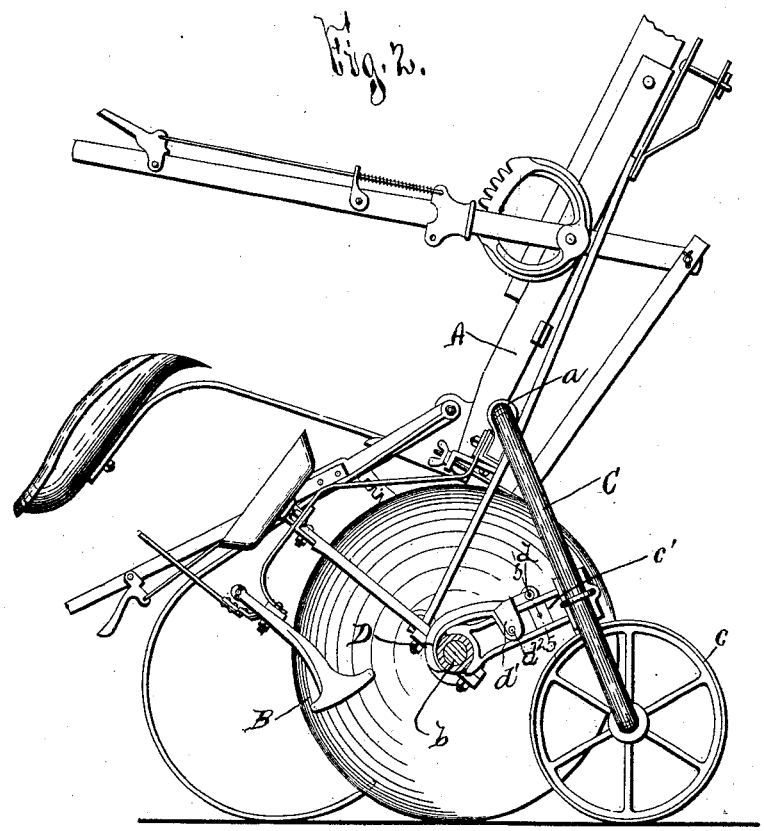

UNITED STATES PATENT OFFICE.

CHARLES S. SHARP, OF AUBURN, NEW YORK, ASSIGNOR TO D. M. OSBORNE & COMPANY, OF AUBURN, NEW YORK, A CORPORATION OF NEW YORK.

HARROW.

SPECIFICATION forming part of Letters Patent No. 694,113, dated February 25, 1902.

Application filed May 25, 1901. Serial No. 61,924. (No model.)

*To all whom it may concern:*

Be it known that I, CHARLES S. SHARP, of Auburn, in the county of Cayuga and State of New York, have invented a certain new and useful Harrow, of which the following is a specification.

This invention relates to harrows, and has for its object the production of a particularly simple and practical means for facilitating transportation of a harrow to and from the place of use; and it consists in certain novel combinations, arrangements, and constructions of the parts of a harrow, as hereinafter fully described, and pointed out in the claims.

Figure 1 is a top plan view of a harrow constructed in accordance with my invention. Fig. 2 is an end elevation, partly in section, of said harrow, the parts being shown in their positions assumed when the disks or working members of the harrow are being raised out of operative position. Figs. 3 and 4 are end elevations, partly in section, similar to Fig. 2, the disks or working members being shown in their inoperative position in Fig. 3 and the supports for holding the disks or working members in their position seen in Fig. 3 being illustrated in Fig. 4 as in their inoperative position. Fig. 5 is a detail sectional view taken on line 5 5, Fig. 2, the catch being shown in its position assumed when the clamping member is in its inoperative position, as seen in Fig. 4.

My improved harrow comprises a frame A, disks or working members B, means for actuating or adjusting said disks or working members, and one or more supports C. Said frame A, disks or working members B, and the means for actuating or adjusting said disks or working members may be of any desirable form, size, and construction, unnecessary to describe herein. The supports C, of which I preferably use two, are pivotally connected to the frame A, being here shown as journaled at corresponding ends in bearings $a$, provided on the frame A. The opposite ends of said supports are provided with suitable traction-wheels $c$ and are movable from in front of the axes of the supports to points beneath and above said axes at the rear thereof. Said supports C are provided with arms $c'$, which are usually adjustable lengthwise thereof, are normally fixed thereto by any desirable fastening means, unnecessary to describe herein, and support the contiguous portions of the harrow, as the shafts $b$ for the disks or working members B. The arms $c'$ when in their operative position, Fig. 3, are preferably extended rearwardly from the portions of the supports C interposed between the frame A and the axes of the traction-wheels $c$, and their free ends are arranged beneath and at the rear of the axes of the supports C and above the traction-wheels. The free ends of said arms $c'$ are provided with clamping members D and catches $d$ and are formed with concave faces for engaging the contiguous portions of the harrow, as front faces of parts of the shafts $b$. Said clamping members D are here shown as levers having their intermediate portions provided with substantially right-angular arms $d'$, pivoted at $d^2$ to the arms $c'$, and having corresponding ends movable vertically at the sides of the arms $c'$ and provided with transverse bearings or openings for receiving the catches $d$ and their other ends formed with concave faces, which when in operative position, as seen in Fig. 3, are opposite to the concave faces of the arms $c'$ and closely fit contiguous portions of the shafts $b$ for firmly locking the arms $c'$ to the shafts $b$ and preventing independent movement of the shafts $b$ or the supports C when said supports are in their operative position. The catches $d$ are of any desirable form, size, and construction, being here shown as spring-actuated bolts which are provided with handpieces $d^3$ and are movable longitudinally in the transverse bearings or openings, previously mentioned, of the clamping members D into and out of engagement with lengthwise edges of the arms $c'$ and into openings extending transversely through the arms $c'$ and when engaged with said lengthwise edges serve to hold the clamping members in their adjusted position.

In the use of my harrow the supports C are normally arranged, as seen in Fig. 4, with their free ends above and at the rear of the axes of said supports, whereupon gravity tends to hold said supports in their adjusted position. When it is desired to transport the harrow, the rear portion thereof, provided with the shafts $b$, may be elevated and the supports C swung downwardly in front of their axes and then rearwardly beneath and at the rear of said axes, as seen in Fig. 3, or, as seen in Fig. 2, the front end of the frame A may be elevated, thus operatively engaging the free ends of the arms $c'$ with the shafts $b$ and causing the disks or operating members to be elevated as the front end of the frame A is depressed.

The supports C and the parts provided thereon are particularly simple in construction, and said supports are readily placed in their operative or inoperative positions and are strong, durable, and effective in use.

The construction and operation of my invention will now be readily understood.

Having thus fully described my invention, what I claim as new, and desire to secure by Letters Patent, is—

1. The combination with a harrow-frame; of a support journaled in the harrow-frame, and provided with a traction-wheel, the portion of the support provided with the traction-wheel being movable from in front of the axis of the support to points beneath and above said axis at the rear thereof, said support being also provided with a normally fixed arm for supporting the contiguous portion of the harrow, and said arm being extended rearwardly beyond the contiguous portion of the support when in its operative position, substantially as and for the purpose described.

2. The combination with a harrow-frame; of a support having one end pivotally connected to the harrow-frame, its opposite end provided with a traction-wheel, and its portion interposed between the harrow-frame and the axis of the traction-wheel provided with a normally fixed arm for supporting the contiguous portion of the harrow, said arm when in its operative position having its free end arranged beneath and at the rear of the axis of the support and above the traction-wheel, substantially as and for the purpose specified.

3. The combination with a harrow-frame; of a support pivotally connected to the harrow-frame and provided with a traction-wheel and with an arm for supporting the contiguous portion of the harrow, said arm being adjustable lengthwise of the support and being normally fixed thereto, substantially as and for the purpose set forth.

4. The combination with a harrow-frame; of a support pivotally connected to the harrow-frame and provided with a traction-wheel and with a normally fixed arm for supporting the contiguous portion of the harrow, said arm being extended outwardly from the contiguous portion of the support between the axis of said support and the axis of the traction-wheel, and a clamping member for preventing movement of said arm independently of the contiguous portion of the harrow, substantially as and for the purpose described.

5. The combination with a harrow-frame; of a support pivotally connected to the harrow-frame and provided with a traction-wheel and with an arm for supporting the contiguous portion of the harrow, a clamping member for preventing movement of the arm independently of the contiguous portion of the harrow, said clamping member being movable relatively to said arm, and means for holding the clamping member in its adjusted position, substantially as and for the purpose specified.

6. The combination with a harrow-frame; of a support pivotally connected to the harrow-frame and provided with a traction-wheel and with a normally fixed arm for supporting the contiguous portion of the harrow, said arm being extended outwardly from the contiguous portion of the support between the axis of said support and the axis of the traction-wheel, a clamping member for preventing movement of said arm independently of the contiguous portion of the harrow, and a catch for holding the clamping member in its adjusted position, substantially as and for the purpose set forth.

7. The combination with a harrow-frame; of a support having one end journaled in the harrow-frame, and its opposite end provided with a traction-wheel and movable from in front of the axis of the support to points beneath and above said axis at the rear thereof, said support being also provided with a normally fixed arm for supporting the contiguous portion of the harrow, and said arm being extended rearwardly beyond the contiguous portion of the support when in its operative position, a clamping member secured to the free end of the arm for engaging the contiguous portion of the harrow, and a catch for holding the clamping member in its adjusted position, substantially as and for the purpose described.

In testimony whereof I have hereunto signed my name, in the presence of two attesting witnesses, at Auburn, in the county of Cayuga, in the State of New York, this 18th day of April, 1901.

CHARLES S. SHARP.

Witnesses:
ELMER W. STUPP,
FRED L. ATHERLY.